INVENTOR.
Otto G. Lellep
By White & Haefliger
ATTORNEYS.

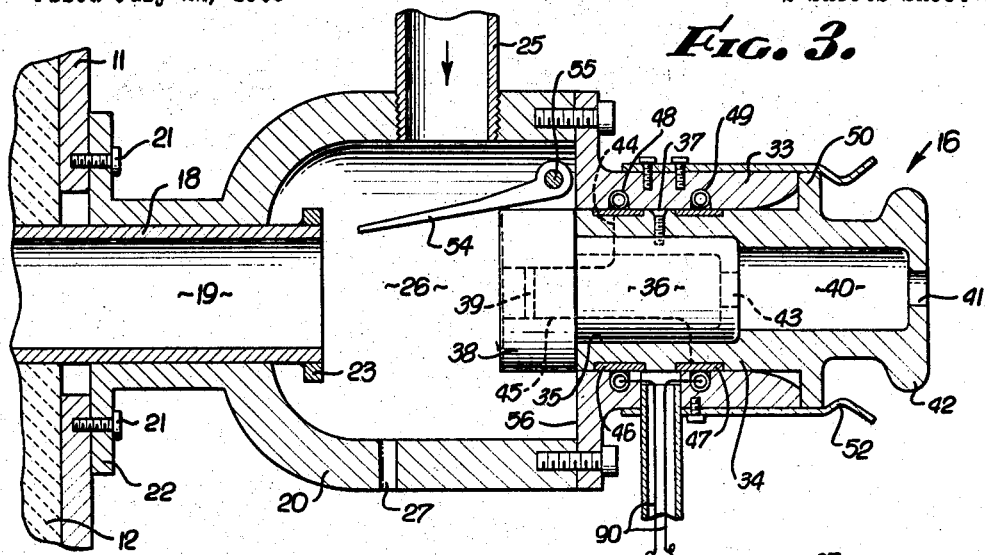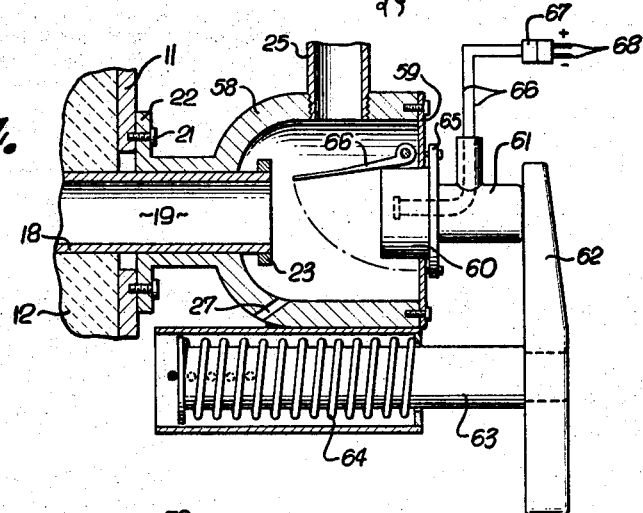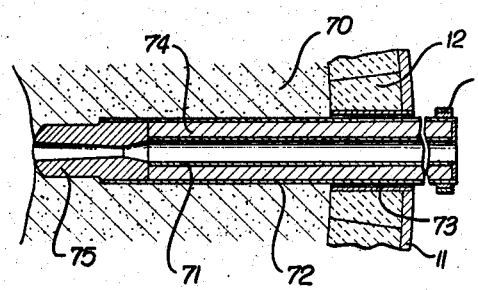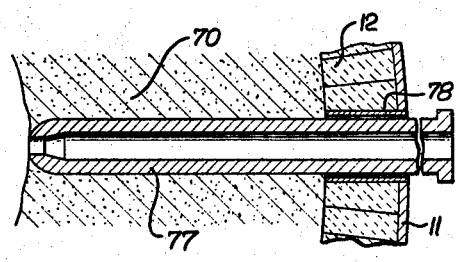

United States Patent Office 3,379,062
Patented Apr. 23, 1968

3,379,062
MEASUREMENT OF ROTARY KILN
TEMPERATURES
Otto G. Lellep, 3990 4th St.,
Riverside, Calif. 92501
Filed July 22, 1965, Ser. No. 474,005
9 Claims. (Cl. 73—351)

ABSTRACT OF THE DISCLOSURE

A system for measuring the gas and solid temperatures in a rotary kiln. A receptacle for receiving a pyrometer is mounted on the kiln, the receptacle having a blower to keep the channel to the kiln interior free of material, and a switching arrangement is connected so as to separate signals for the gas and solid temperatures. A heat barrier protects the blower and pyrometer from excessive kiln temperatures.

---

This invention has to do generally with the measurement of temperatures inside rotary kilns wherein a material is progressively heated in passing through the kiln to high temperatures by contact with incandescent combustion gases. The invention has important, though typical, applicability to the measurement of solids and gaseous atmosphere temperatures within portland cement kilns, and will be described in reference to that illustrative adaptation.

In its more particular aspects the invention is directed to improvements in the invention of my copending application Ser. No. 442,128, filed March 23, 1965, now Patent No. 3,345,878, on Rotary Kiln Temperature Measurement. Briefly, that invention presents important departures from past rotary kiln temperature measurements confined to sensing at the inlet and outlet ends of the kiln, by providing for determinations of the kiln material and gas atmosphere temperatures at any predetermined location or locations along the kiln. The general concept employed is that of providing a sight or radiation transmission passage through the wall of the kiln in alinement with a temperature sensing instrument, such as an optical pyrometer, carried by the outside of the kiln. Provision is made for keeping the radiation transmission clear throughout the kiln rotation by maintaining a constant flow of air through the passage into the kiln, thus to permit measurement of both solids and gas temperatures. Air delivery to the passage is supplied by a blower which is also mounted to the kiln and which may serve the additional purpose of cooling the pyrometer.

Among its various objects, the present invention aims to protect the pyrometer and blower against excessive heat transmission from the kiln, by interposing between the pyrometer and blower heat barrier means serving to safely limit such heat transmission. Preferably, the heat barrier function is served by interposing between the pyrometer-blower assembly, and in spaced relation to the kiln shell, a barrier member or medium of low heat conductivity and permitting of air circulation along its inside and outside surfaces.

The invention further aims to afford access to the pyrometer for inspection, replacement or repair during the kiln rotation and in a manner necessitating no stoppages of the kiln rotation. This objective is achieved by providing a pyrometer housing, which may have characteristics of a socket, removably retaining the pyrometer, the latter being so constructed and accommodated that it may be manually grasped and removed or replaced with the kiln continuing in rotation. In conjunction with this feature the invention further contemplates providing within the pyrometer housing or in conjunction therewith, a normally open valve in the radiation path and which closes or opens respectively as the pyrometer is removed or returned to its housing.

A further feature and object of the invention is the provision of means for transmitting the pyrometer signal to stationarily located recording equipment. Optionally, in conjunction with such transmission, means may be provided for interruptedly transmitting the pyrometer signal during selective predetermined intervals of the kiln rotation, thus to permit more definite and accurate measurements of the solids and gas temperatures in the kiln, as will later appear.

The invention has various additional features, such as the use of specially formed and variable tubes to form the sight or radiation passages, all of which together with the manner of accomplishment of the objects referred to hereinabove, will be understood from the following detailed description of certain illustrative embodiments of the invention shown by the accompanying drawings, in which:

FIG. 3 is an enlarged showing in axial cross section of one form of removable and replaceable pyrometer and associated valve;

FIG. 4 is a view similar to FIG. 3 showing a variational form of removable pyrometer; and FIGS. 5 and 6 are sectional illustrations of variational forms of adjustable and replaceably sight tubes.

Figure 1:
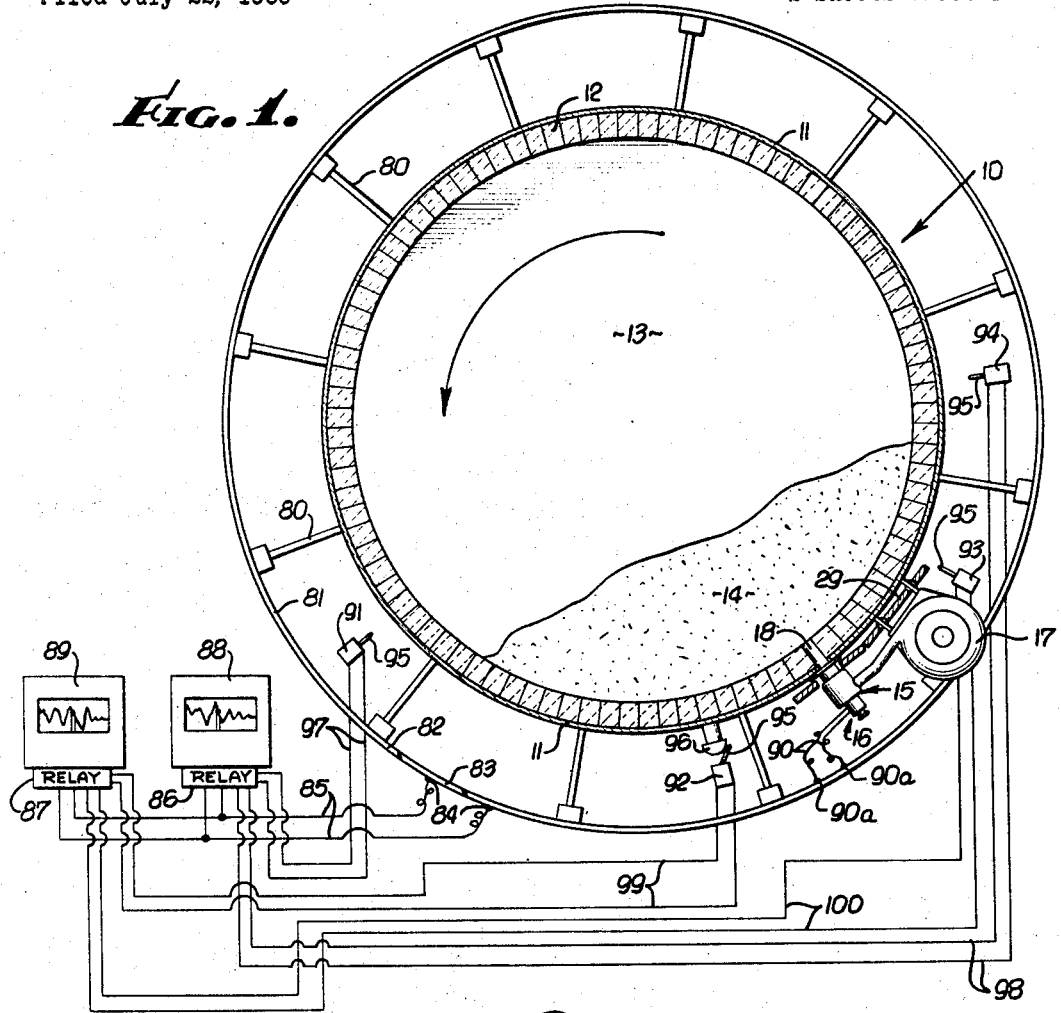
FIG. 1 is a view illustrative of a rotary kiln in cross section, and showing for the most part in elevation, the associated structures and device with which the invention is concerned.

Referring first to the general showing of FIG. 1, it is to be understood that the section there taken may be at any location longitudinally of the kiln at which it is desired to obtain internal temperature measurements, and that such determinations may be made at different locations longitudinally of the kiln by duplicating the temperature sensing and recording means to be described.

The rotary kiln, generally indicated at 10, may be of a usual type employed e.g. for converting portland cement raw mix to clinker by introduction of the raw mix to one end of the kiln and withdrawal of clinker from the opposite end, the conversion occurring in an atmosphere of high temperature combustion gases passing through the kiln. The latter is shown to comprise a metallic shell 11 lined with fire brick-type insulation 12, the kiln being constantly rotated in the direction of the arrow by conventional means not shown. For present purposes it will suffice to characterize conditions inside the kiln as involving the transmission of heat from the generally upper high temperature gas zone 13 to the mobile solids mass 14 which, by reason of the kiln rotation, tends to be displaced upwardly toward one side of the kiln, as illustrated.

In common with the invention of my copending application referred to hereinabove, the present kiln temperature sensing system employs means generally indicated at 15 which provides a radiation passage, for convenience termed also a sight passage or sight tube, extending through the shell composite of the kiln to provide for the transmission of radiation from the zone 13 and the material 14 to an optical-type pyrometer 16, provision being made for keeping the sight passage free of clogging accumulations by means of a motor driven blower 17 which constantly discharges air through the sight passage and also in cooling relation to the pyrometer.

Figure 2:
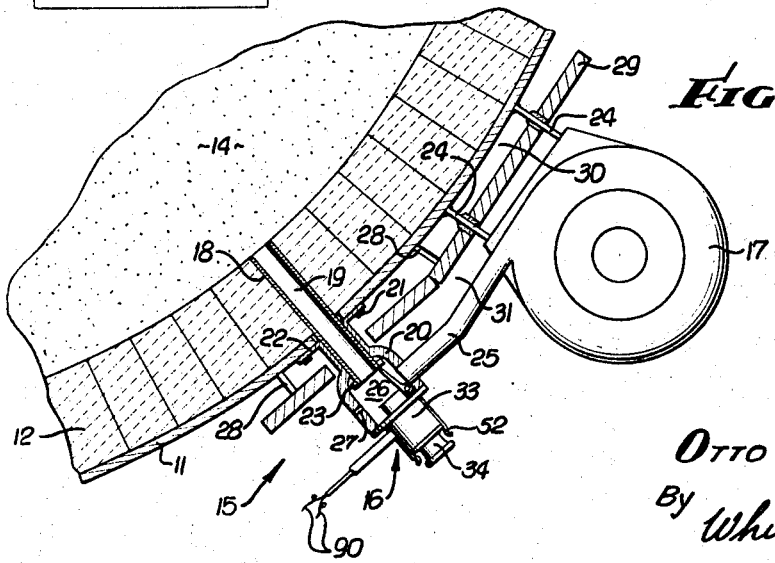
FIG. 2 is a fragmentary enlargement, mainly in cross section, showing the blower, pyrometer and sight tube assembly carried by the kiln shell, with the interposed heat barrier.

FIG. 2 more particularly illustrates this general assembly to comprise a temperature resistant metallic or other refractory material tube 18 extending through the kiln shell 11 and lining 12 to provide an open sight passage 19 which is here shown to extend radially of the shell, but which if desired, may be positioned to extend angularly with relation to a radial line of the shell. The pyrometer structure 16 is shown to comprise a housing 20 attached to the shell 11 as by bolting at 21 a flanged end 22 of the housing, the tube 18 extending into the housing and having therein a flanged end 23 which may be engaged by a tool to withdraw the tube from the kiln for inspection, replacement or repair.

The blower 17, driven by an associated motor, not shown, is mounted in spaced relation to the shell 11 as by bolts or studs 24 and has its outlet duct 25 discharging air into the pyrometer housing chamber 26 so that a constant flow of the air, at a pressure of say 2 to 3 pounds per square inch, is maintained through the sight tube passage 19 at a velocity sufficiently high to displace any solids tending to accumulate in the passage or interfere with radiation therethrough to the pyrometer. The housing 20 may contain also a vent aperture 27 which permits a portion of the blower air to sweep across and cool the pyrometer before exhausting to atmosphere.

Considering that the kiln shell temperature may be high, say in the order of 600° F., it is desirable that the pyrometer and blower motor be given such heat insulation from the shell as will maintain them at safe, considerably lower temperatures. For this purpose I mount to the shell as by bolts or studs 28, a heat barrier in the form of a baffle 29 through which the supports 24 and pyrometer housing 20 extend, the barrier being at least as wide as the assemblage to be protected and being spaced at 30 from the kiln and at 31 from the blower and body of the housing 20. Thus as the kiln rottaes, constant air flow is maintained through the spaces at 30 and 31 thus to supplement the thermal insulation afforded by the baffle 29 itself. The latter may be made of any suitable material having low thermal conductivity, such as a somewhat loose fiberglass composition or any of various porous or cellular materials.

In reference now to FIG. 3, I have previously indicated the desirability for so mounting the pyrometer that it may be removed from or returned to its housing while the kiln remains in rotation, or during such time as the rotation may be slowed down to enable an operator standing on a scaffold to remove or replace the pyrometer. In the preferred form of FIG. 3, the pyrometer housing 20 is shown to have a reduced tubular socket portion 33 which slidably receives the body 34 of the pyrometer proper, the latter containing within counterbore 35 the pyrometer instrument having a reduced extension or plug 36 retained by screws 37, and having an enlarged head 38 projecting into the chamber 26 and containing a temperature or radiation sensing element 39 which is alined with passage 19, as well as with bores 35 and 40 and an opening 41 in the knob or handle end 42 of the pyrometer body. The instrument shank portion 36 may also contain an end opening 43 alined with passage 19 and opening 41. These openings may be left clear to given glass closures through which the operator may look through to the pyrometer 39 and beyond. It will be understood that the pyrometer sensor 39 may be of any suitable known type, including more recently developed types using combinations of semiconductors which generate voltage when exposed to heat rays. This new type has advantages over the older thermopile sensors in that they react to temperature changes practically instantaneously and their indications are not influenced by water vapor or carbon dioxide near the target.

The pyrometer body 36 contains conductors diagrammatically indicated at 44 and 45 leading respectively to conductive rings 46 and 47 which in turn are contactable with annular conductors, as in the form of coils 48 and 49, contained within recesses in the housing 33. The contact position of FIG. 3 is established by the engagement of flange 50 on the pyrometer body section 15 with the end of the housing 33. The parts are releasably held in this relation as by springs 52 bearing against the flange 50 in the manner indicated.

The housing chamber 26 contains an appropriate check valve which operates upon withdrawal of the pyrometer housing 33 to close the inner end of the body pyrometer housing against consequential air escape from the housing. As illustrative, the chamber is shown to contain a flap valve 54 pivoted on pin 55 and displaceable by air pressure in chamber 26 upon removal of the pyrometer to bear against the annular internal housing surface 56 to close the inner end of 33.

When it is desired to remove the pyrometer for inspection or repair, the kiln rotational speed is reduced and an operator, by grasping the head 42, pulls the pyrometer from the housing against the resistance of springs 52. Valve 54 immediately closes against surface 56. When it is desired to reinsert the pyrometer, its body is thrust against springs 52 and fully into shouldered engagement against the body 33, simultaneously opening the valve 54 to clear the sight passage projection to the pyrometer.

FIG. 4 illustrates a variational form of pyrometer assembly in which the housing 58 has its cover 59 centrally apertured to removably receive the pyrometer 60, which may be of a known type and is generally designated by its body configuration. The latter has extended portion 61 which normally is engaged by arm 62 on shaft 63 urged to the left by spring 64, to press the pyrometer body flange 65 against the housing cover 59. As before, valve 66 normally is held open by engagement against the pyrometer housing. Extension 61 suitably accommodates leads or conductors 66 extending from the pyrometer proper to a separable coupling 67 from which leads 68 may go to the later described slip rings. To remove the pyrometer 60, arm 62 is swung clear of extension 61, coupling 67 disconnected, and the pyrometer assembly is pushed out by air pressure from its housing 68, valve 66 in response to air pressure, closing against the cover 69. A reverse procedure is followed in reinserting and connecting the pyrometer.

In the course of the kiln operation its lining 12 may acquire adhered kiln coating accumulations 70, see FIGS. 5 and 6, which could present difficulties in maintaining the inner end of the sight tube free from obstruction. As such accumulations develop, it may be desirable to substitute longer sight tubes that can be projected through the coating. Accordingly, the previously described tube 18 may be replaced as in FIG. 5 by a heat resistant tubular assembly comprising spaced inner and outer metallic tubes 71 and 72, the latter being frictionally held within sleeve 73 welded to the kiln shell. The tubes 71 and 72, made of heat resistant metals such as chromium alloy, contain between them and protect a tubular body of graphite 74 from which projects a refractory tip 75, which for example may be of cermet composition. Flanged at 76, the tube assembly may be removed or longitudinally adjusted by a suitable tool applied to the flange.

FIG. 6 illustrates another form of extended, adjustable tube 77 frictionally held within sleeve 78 and having single wall thickness of a refractory material, such as a cermet, which assures both adequate strength and resistance to the kiln temperatures.

In further reference to FIG. 1 the invention contemplates transmission of the pyrometer output or signal to suitable means operating to record both, and preferably separately, the temperatures in the gaseous atmosphere 13 and solids 14 inside the kiln. For this purpose the kiln shell carried, as by supports 80, a concentric slip ring 81 having separate parallel conductor tracks 82 and 83 contacted by stationary positioned brushes, diagrammatically indicated at 84, having connections 85 with relays 86 and 87 which control the operation of temperature recorders 88 and 89, which may be of any known or conventional type. Referring to FIG. 3, the annular conductors 48 recessed into the pyrometer housing have leads 90 connecting respectively through brushes 90a with the slip rings 82 and 83. Thus the pyrometer signal goes by way of conductors 85 and relays 86, 87 to the recorders 88 and 89.

It is found to be of primary importance that accurate recordings be made of the temperatures in the gaseous atmosphere 13 and within the solids 14, and that it may be undesirable to record boundary temperatures, which are less meaningful toward the side extremes of the solids where indicated temperatures resulting from agitation and thinning out of the solids-to-gas interface may reflect phase mixture temperatures but not a distinct temperature measurement of either phase, at least corresponding to their maximum values. Accordingly, provision is made for selectively confining temperature measurement and recording to those intervals which will obviate confused or unnecessary temperature determinations. Stationarily mounted at the outside of the kiln by suitable means, not shown, is a sequence of switches 91, 92, 93 and 94 having arms or levers 95 in the path of an actuator 96 carried by and projecting from the kiln shell 11 to rotate therewith. Switches 91 and 94 are connected respectively by circuits 97 and 98 with relay 86, and switches 92 and 93 are connected respectively with relay 87 through circuits 99 and 100.

As the kiln rotates, actuator 96 may be assumed first to actuate switch 91 which through the relay 86 stops the recorder 88 which has been recording temperatures transmitted to the pyrometer from the gas zone 13. Recorder 89, which records the solids temperature, will have been inactive and both recorders remain inactive until projection 96 actuates the switch 92. Thereupon, relay 87 responds to start the recorder 89 in operation, which so continues until switch 93 is actuated to cause the relay 87 to stop the recorder 89. Both recorders then remain inoperative through the interval of the actuator 96 travel between switches 93 and 94. Actuation of the latter then starts recorder 88 into operation, which continues through the interval of travel of 96 from switch 94 to switch 91. Thus the recordings become those of the accurately meaningful maximum temperatures in zone 13 and within the inner body of the solids 14.

As will be understood without further illustration, power supply to the motor or blower 17 may be accomplished as by way of a duplicate set of slip rings corresponding with 82, 83, and having brush connections with leads going to the blower motor.

I claim:

1. The combination comprising a rotary kiln through which a material passes while being heated to elevated temperature by hot gases within the kiln, means forming a passage through the wall of the kiln, a pyrometer mounted to the outside of the kiln for rotation therewith and alined with said passage to receive radiation from the kiln interior through the passage, a housing containing the pyrometer and normally communicating with said passage, a blower carried by the kiln and connected to said housing to displace air through the housing and said passage into the kiln, and means whereby the pyrometer normally is retained within the housing and is manually removable therefrom and replaceable therein during the kiln rotation.

2. The combination of claim 1, in which said housing is in the form of a socket and the pyrometer is of a removable plug formation received within and projecting from the socket, and in which said socket and plug have interengaging electrical conductors connecting with the pyrometer.

3. The combination of claim 1, in which said housing contains a normally open valve operable by air pressure inside the housing to close its communication with said passage upon removal of the pyrometer from the housing.

4. The combination comprising a rotary kiln through which a material passes while being heated to elevated temperature by hot gases within the kiln, means forming a passage through the wall of the kiln, a pyrometer mounted to the outside of the kiln for rotation therewith and alined with said passage to receive radiation from the kiln interior through the passage, means operating to project an air stream through said passage into the kiln to displace kiln contents tending to enter the passage, a heat transmission barrier interposed between said pyrometer and kiln and spaced from the kiln, a housing containing said pyrometer and communicating with said passage, and means whereby the pyrometer normally is retained within the housing and is manually removable therefrom and replaceable therein during the kiln rotation.

5. The combination of claim 4, comprising a normally open valve in the pyrometer housing operable to close the housing communication with said passage upon withdrawal of the pyrometer from its housing.

6. The combination of claim 4, in which said air projecting means comprises a blower mounted to the kiln and positioned at the outside of said barrier and said heat transmission barrier is interposed between and spaced from the kiln and also from the blower and pyrometer.

7. The combination comprising a rotary kiln through which a material passes while being heated to elevated temperature by hot gases within the kiln, means forming a passage through the wall of the kiln, a pyrometer mounted to the outside of the kiln for rotation therewith and alined with said passage to receive radiation from the kiln interior through the passage, means operating to project an air stream through said passage into the kiln to displace kiln contents tending to enter the passage, temperature recording means, means electrically conecting said pyrometer and recording means during the kiln rotation, and means operable to deactivate the recording means during a predetermined interval of the kiln rotation.

8. The combination comprising a rotary kiln through which a material passes while being heated to elevated temperature by hot gases within the kiln, means forming a passage through the wall of the kiln, a pyrometer mounted to the outside of the kiln for rotation therewith and alined with said passage to receive radiation from the kiln interior through the passage, means operating to project an air stream through said passage into the kiln to displace kiln contents tending to enter the passage, temperature recording means, means electrically connecting said pyrometer and recording means during the kiln rotation, said temperature recording means including means for separately recording solid material and gaseous atmosphere temperatures inside the kiln.

9. The combination of claim 8, comprising means for selectively deactivating said recording during predetermined intervals of the kiln rotation.

References Cited

UNITED STATES PATENTS 2,275,265  3/1942  Mead _____ 236—15
3,273,874  9/1966  Hocke _____ 263—33

FOREIGN PATENTS 127,571  11/1928  Switzerland.

LOUIS R. PRINCE, *Primary Examiner.*

FREDERICK SHOON, *Assistant Examiner.*